Patented Apr. 1, 1941

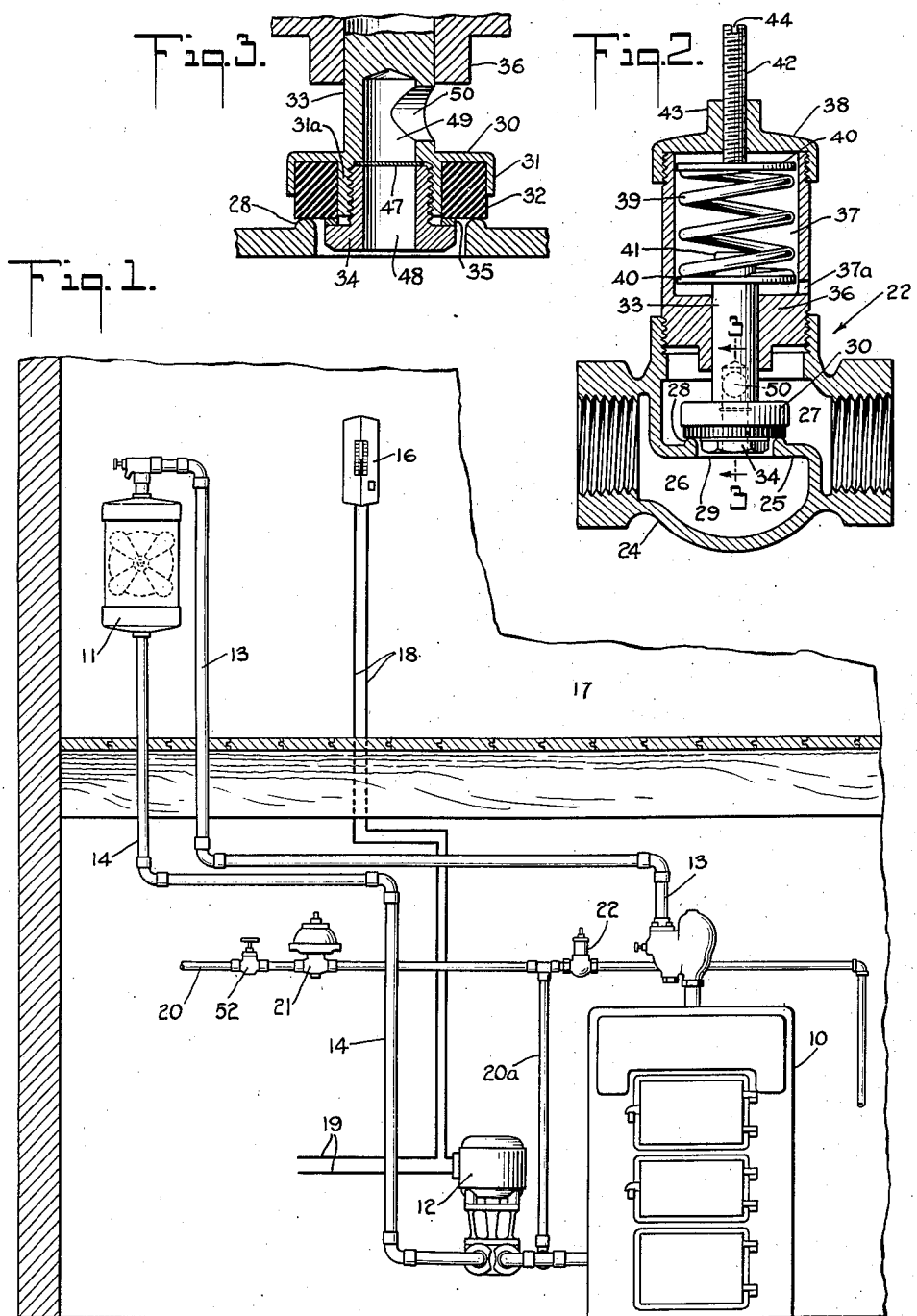

2,236,564

UNITED STATES PATENT OFFICE 2,236,564

PRESSURE RELIEF VALVE

Edward S. Cornell, Jr., Larchmont, N. Y.

Application August 26, 1938, Serial No. 226,881

1 Claim. (Cl. 137—53)

This invention relates to pressure relief valves.

In particular, the invention relates to valves designed to preclude flow of water or other fluid therethrough at all pressures below a certain established maximum, and to insure flow of fluid upon the attainment of a desired maximum pressure.

Such relief valve is applicable for service in an installation in which the normal operating pressure is below a desired maximum, whereas the desired maximum is below a pressure condition which would expose the installation to the danger of explosion. A typical example of such an installation is a pressure hot water heating system, such heating system being defined as one in which pressure is maintained at a degree which will permit the heating of the water within the system to a temperature substantially in excess of 212° F., and having a pressure relief valve, in contradistinction to the open tank, to relieve pressure within the system in the event that it attains a value in excess of a desired maximum point.

It is an object of the present invention to provide a pressure relief valve in which the use of a conventional flexible diaphragm or equivalent valve operating element is eliminated.

It is a further object of the invention to provide a pressure relief valve which incorporates a positive safety pressure relief element to prevent the building up of excessive pressures within the piping system in the event that corrosion or like condition prevents the normal operation of the valve disk or in the event that the valve is inadvertently set at a value that will not permit the opening of the valve disk when the maximum desired pressure is attained.

In the present invention, the pressure relief valve may be of the conventional globe type, the valve stem of which is subjected to a positive spring pressure which maintains the valve disk in yieldable contact with the valve seat. The valve spring is desirably housed in a chamber which is entirely apart from the fluid flow chambers of the valve per se.

In the present invention, the pressure of the water in the pipe line is arranged to be exerted directly against the under-side of the valve disk, and such valve disk performs the function of the conventional diaphragm. It is a novel feature of the invention that the valve disk assembly may include a safety element placed in waterflow preventing relationship, within a passage connecting the "up-stream" and "down-stream" sides of the valve body. Such safety element prevents flow of water through the stated passage, and during the normal operation of the valve is entirely inoperative except as to form a portion of the valve disk. However, should corrosion or other abnormal condition occur and the valve disk remain seated against the valve seat when the pressure has attained an undesirable high point, the safety element will rupture, thus permitting flow through the valve and affording immediate relief from the pressure condition.

Other features and advantages will hereinafter appear.

In the accompanying drawing,

Fig. 1 represents the improved relief valve as applied to a closed circuit, i. e. pressure type, hot water heating system.

Fig. 2 is a sectional elevation of the pressure relief valve forming the subject matter of the present invention, and Fig. 3 is an enlarged section taken along the lines 3—3 of Fig. 2.

Referring to the drawing, Fig. 1 illustrates a typical example of use of my improved pressure relief valve, namely, a hot water heating system of the closed circuit type, comprising a boiler 10, provided with suitable heat generation apparatus for heating water for circulation through the heating system, one or more radiators 11, and an electric motor driven pump 12 for enforcing circulation of the heated water from the boiler through supply main 13 to the radiators 11 and thence through return main 14 to the boiler.

Additionally, the heating system includes a suitable temperature control device such as the room thermostat 16 placed, in accordance with established practice, in a room 17 heated by a radiator 11. The thermostat 16 is preferably of the electrical make and break type, in which a thermally responsive electric switch makes or breaks the circuit 18 which supplies the motor of the pump 12. The lead wires 19 indicate the source of electric power for the motor; such electric power may be the conventional domestic lighting supply.

In the illustrated heating system, water supply pipe 20 is connected to the domestic water supply. As is well known, such water supply is often of the order of 40 to 60 pounds per square inch pressure; to reduce such pressure to a point rendering it suitable for use with the boiler 10, there is provided a suitable pressure reducing valve 21.

The boiler 10 may be of the familiar sectional cast iron construction. The present standard pressure rating for such a cast iron boiler is 30 pounds per square inch; the subjection of such boiler to pressures in excess of 30 pounds per square inch may crack one or more of the sections and render the entire heating system inoperative.

Pursuant to the above, the heating system is provided with a pressure relief valve 22, which may be installed at any point in the system, but advantageously is located at the point of connection of the water service line 20 with the boiler water inlet line 20a. The pressure relief valve is arranged to relieve pressure by discharging water from the system when the pressure therein reaches a desired point below the 30 pounds per square inch boiler rating. Desirably, such pressure relief valve is set to operate, i. e. to discharge water from the system, when the pressure therein reaches 24 to 26 pounds per square inch.

Referring now to Fig. 2, which is a substantially full size sectional elevation of a pressure relief valve 22 forming the subject matter of the present invention, the valve includes a valve body 24, which may be of conventional globe valve type, and as such embodying a septum 25 dividing the valve body into an "up-stream" or inlet chamber 26 and a "down-stream" or outlet chamber 27. The septum may be provided with, or have formed integral therewith, a valve seat 28, the port 29 of which is of desired area.

The valve body is illustrated as of the conventional screw-threaded type, and is preferably of copper, brass, or other substantially corrosion resisting material.

For cooperation with the valve seat 28, there is provided a valve disk assembly which, as is illustrated in detail in Fig. 3, may include a valve disk housing 30, the downwardly depending flanges 31 and central neck 31a of which form an annular space within which may be positioned any valve disk 32, of material suitable for service under the temperature and pressure conditions present within the heating system. Such material may be the well known "Jenkins disk" material or equivalent.

The valve stem 33 may be integral with the valve disk housing 30, or otherwise suitably joined thereto.

For retaining the valve disk 32 within its housing 30, there is provided a valve disk clamping nut 34 having a male threading for cooperation with suitable female threading in the neck 31a. A suitable bearing washer 35 may be employed; such washer may also serve the purpose of a lock washer.

The valve stem 33 is slidably journaled, for relatively free reciprocal action, in the valve bonnet 36. It is desirable that valve stem 33 be in close slidable engagement, within reasonable manufacturing tolerances, with the aperture in the bonnet 36 through which it passes. Such close fit eliminates the necessity of additional packing means, as the free discharge of water through pipe 23 minimizes back pressure generation within the chamber 27.

The valve bonnet 36 has secured thereto, desirably as an integral part thereof, a chamber 37, said chamber being closed by the illustrated screw-threaded cap 38. Any suitable number and disposition of vent holes 37a may be provided. Within such chamber 37, there is provided a suitable coil spring 39 or equivalent. Such coil spring is confined between a pair of opposed plates or bearing disks 40, 40, the lower bearing disk 40 having a central aperture which permits the passage of a reduced diameter neck 41 of the valve stem 33. The line of demarcation between the neck 41 and the main valve stem 33 is desirably square, to form a square-cut shoulder against which the lower disk 40 may press. The upper disk 40 is arranged for co-operation with a pressure adjustment screw 42, said adjusting screw desirably being of relatively fine thread and screw-threadedly inserted into a relatively elongated boss 43 of the cap 38. The adjusting screw may have a conventional screw driver slot 44, as illustrated, or may be provided with a suitable head for the reception of a wrench or other tool for rotating the screw in one or the other direction to increase or decrease the amount of compression of the coil spring 39.

The coil spring 39 maintains the valve disk in yieldable flow-sealing engagement with the valve seat 28, against the upward pressure exerted by the fluid on the valve disk. Adjustment screw 42 provides for pre-setting the pressure at which the fluid pressure in valve inlet chamber 26 will overcome the bias of the spring 39 to move the valve disk upwardly away from the seat and permit flow into the discharge chamber 27 of the valve and thence out through the valve discharge line 23.

It is a feature of the present invention that, in addition to the provision for relief of pressure by the lifting of the valve disk from the valve seat, there is provided a safety element which is of the nature of a replaceable frangible disk 47 calculated to rupture when subjected to a pressure above the maximum desired water pressure but below the maximum boiler rating pressure. As an example, the frangible disk may be of such material as will rupture under a pressure of from 27 to 29 pounds per square inch.

The frangible disk 47 may be located at any convenient point in the "up-stream" side of the valve structure. Desirably, and as is illustrated in Fig. 3, the said disk is directly associated with, and may form a part of, the valve disk assembly. In Fig. 3, said disk 47 is interposed in positive water flow sealing relationship between a suitable axial passage 48 in the clamping nut 34 and a cooperating passage 49 and discharge outlet 50 formed in the lower portion of the valve stem 33. As is illustrated in Fig. 2, the outlet 50 discharges into the outlet chamber of the valve body 24, and it will be obvious that the rupturing of the disk 47 will permit flow and consequent pressure relief in the event that corrosion or other abnormal physical condition binds the valve stem 33 or otherwise prevents the lifting of the valve disk away from the seat 28 upon the attainment of the fluid pressure for which the spring 39 has been set to relieve.

To secure disk 47 in water flow sealing position while rendering it readily accessible for replacement or inspection, it may be clamped between the uppermost surface of the clamping nut 34 and the lowermost surface of the passage 49 in the valve stem 33. Thus, upon screwing up the clamping nut 34, disk 47 is confined, in a manner affording a positive water seal, between the passages 48, 49.

It will be noted that passage 48 and frangible disk 47 are remote from valve disk 32, and that the neck 31a and the threaded spud of the securing nut 34 provide positive means for isolating said valve disk 32 against encroachment upon the passage 48 or the frangible disk 47. Such relative location of the stated elements renders it impossible for the valve disk 32 in the event of swelling or disintegration of the same under the influence of hot liquid, from blocking off the relief passage 48 or from penetrating said passage to dam the hole or break in said frangible disk in the event that the said frangible disk has ruptured in fulfillment of its pressure relief function.

It is desirable that the material of the element 47 be relatively closely similar to, in an electrochemical sense, the materials of the clamping nut 34 and the valve stem 33, to preclude any electrochemical action between the stated elements. In practice, it has been found that a copper disk, of the order of .003 to .004 inch in thickness, may be satisfactorily employed with a copper or brass clamping nut and valve stem.

As appears from Fig. 2, the pressure relief valve 22 does not employ a separate diaphragm as an actuating valve element. The valve disk assembly 30 per se combines the function of valve disk and valve actuating element, and in addition provides for the positive relief of pressure through the rupturing of its associated safety element 47. Such employment of the valve disk assembly in lieu of the customary pressure-responsive diaphragm eliminates a source of weakness which has often caused faulty operation and interruption of service.

The valve 22 is not restricted to the vertical positioning illustrated in Fig. 1. The absence of diaphragm element renders it immaterial whether the chamber 37 is disposed horizontally, or projects downwardly, with respect to the line in which it is installed.

In the operation of a heating or other pressure system incorporating the present invention, and assuming that unforeseen conditions have prevented the normal operation of the pressure relief valve, the rupturing of the element 47 permits a discharge of water through the discharge pipe 23 at a time before such pressure is generated in the system as to cause breakage of the boiler or any other weak spot in the piping system. The flow of water through the pipe 20 and out through the discharge pipe 23 will apprise the custodian of the system of the operation of the pressure relief valve. In such circumstance, the flow of water may be cut-off by operation of any conventional shut-off valve 52, and the pressure relief valve 22 be removed from the system for inspection or repair.

Whereas, I have described my invention by reference to a specific form thereof, it will be understood that many changes and modifications may be made without departing from the spirit of the invention.

I claim:

A pressure relief valve comprising, in combination, a valve body having a valve seat provided ported septum dividing said body into inflow and outflow chambers, valve stem means mounted within said valve body for slidable movement toward or away from said valve seat, said valve stem being adjustably loaded for normal movement toward said valve seat, said valve stem being provided with a passage affording flow from said inflow to said outflow valve chambers, valve disk holding means operatively associated with said valve stem and including an annular neck concentric with said valve stem and extending downwardly therefrom, annular valve disk means disposed circumferentially of said neck, frangible disk means disposed within said neck and blocking off said valve stem passage, said valve disk being remote from said frangible disk means, and means screw-threadedly secured to said neck internally thereof and serving conjointly to secure said frangible disk means and said valve disk, said securing means having an axial passage therethrough remote from said valve disk, to communicate with said valve stem passage upon rupture of said frangible disk, whereby fluid flow can pass from the inflow to the outflow chambers of said valve irrespective of the position of said valve disk.

EDWARD S. CORNELL, JR.